United States Patent [19]

Pirl

[11] Patent Number: 5,371,767
[45] Date of Patent: Dec. 6, 1994

[54] SYSTEM AND METHOD FOR LASER WELDING AN INNER SURFACE OF A SMALL DIAMETER TUBULAR MEMBER

[75] Inventor: William E. Pirl, Trafford, Pa.

[73] Assignee: Westinghouse Electric Corporation, Pittsburgh, Pa.

[21] Appl. No.: 189,777

[22] Filed: Feb. 1, 1994

[51] Int. Cl.⁵ ............................................. B23K 26/00
[52] U.S. Cl. ................................ 376/260; 219/121.63
[58] Field of Search ................. 376/260; 219/121.63, 219/121.64, 121.78, 121.8, 121.82

[56] References Cited

U.S. PATENT DOCUMENTS

| | | | |
|---|---|---|---|
| 4,978,834 | 12/1990 | Griffaton | 376/260 |
| 5,066,846 | 11/1991 | Pirl | 376/260 |
| 5,097,110 | 3/1992 | Hamada et al. | 376/260 |
| 5,179,260 | 1/1993 | Kroehnert | 219/121.63 |
| 5,182,429 | 1/1993 | Pirl et al. | 376/260 |
| 5,196,671 | 3/1993 | Kroehnert | 219/121.63 |
| 5,221,822 | 6/1993 | Duny | 219/121.63 |

Primary Examiner—Daniel D. Wasil
Attorney, Agent, or Firm—Walter S. Stevens

[57] ABSTRACT

System and method for laser welding an inner surface of a small diameter tubular member. The system includes a laser for generating laser light and a mirror optically coupled to the laser for reflecting the light onto the inner surface of the tubular member to laser weld the inner surface of the tubular member. A rotator assembly is connected to the mirror for rotating the mirror in order to weld around the inner surface of the tubular member. The mirror and rotator assembly are each sized to be disposed in the tubular member at a location adjacent the portion of the tubular member to be welded. The rotator assembly has a spiral groove formed in the exterior thereof for receiving a cord wrapped around the exterior of the rotator assembly. An end of the cord is connected to a motor located externally to the tubular member, so that the cord is pulled as the motor is operated. As the cord is pulled, the rotator assembly rotates for rotating the mirror. A retainer is also provided for retaining the cord in the groove as the rotator assembly rotates. Therefore, the rotator assembly and the mirror associated therewith are rotated by a motor located externally to the tubular member. Thus, the system and method of the invention are capable of welding small diameter (e.g., diameters equal to or less than 0.313 inch) tubular members because the motor is located externally to the tubular member rather than being disposed in the tubular member.

13 Claims, 6 Drawing Sheets

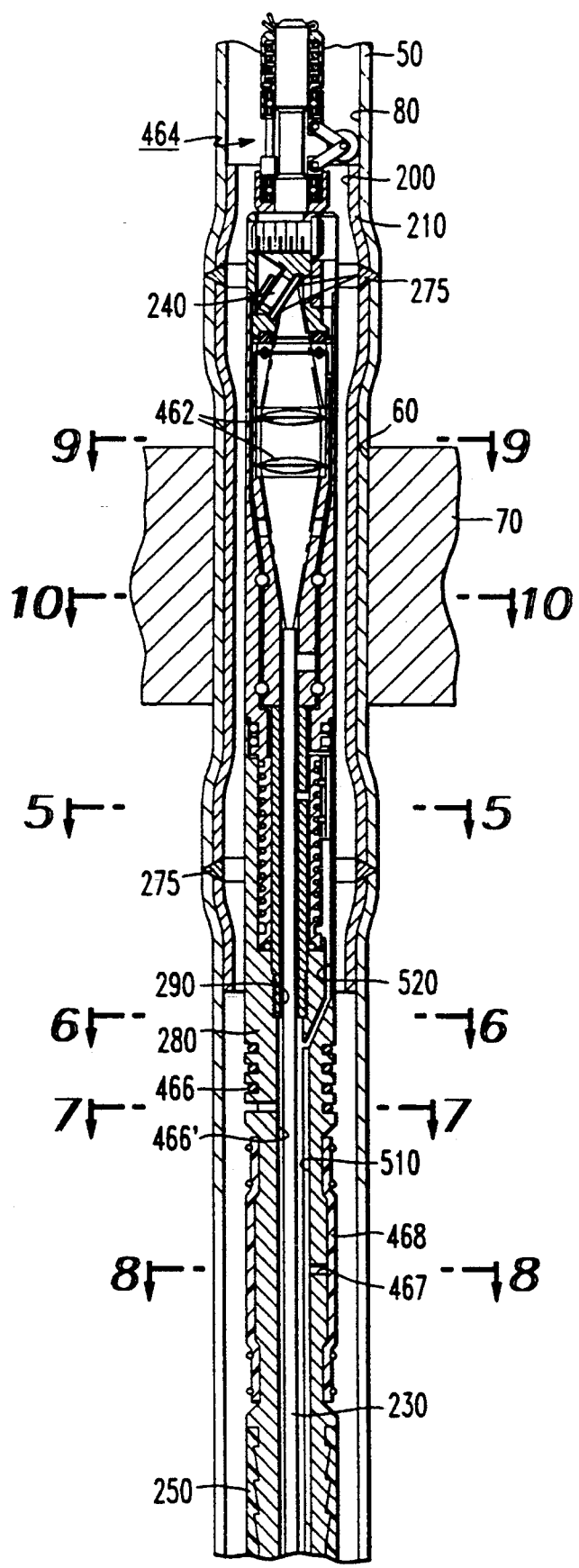

SYSTEM AND METHOD FOR LASER WELDING AN INNER SURFACE OF A SMALL DIAMETER TUBULAR MEMBER

BACKGROUND

This invention generally relates to welding apparatus and methods and more particularly relates to a system and method for laser welding an inner surface of a small diameter tubular member, which tubular member may be a repair sleeve disposed in a nuclear heat exchanger heat transfer tube.

Although laser welding apparatus and methods are known, it has been observed that these apparatus and methods have a number of operational problems associated with them that make such apparatus and methods less than completely satisfactory for welding an inner surface of a small diameter tubular member. However, before these problems can be appreciated, some background is desirable as to the structure and operation of a typical nuclear heat exchanger.

In a typical nuclear heat exchanger or steam generator, a heated and radioactive primary fluid flows through a plurality of U-shaped tubes, each of the tubes having a fluid inlet and a fluid outlet end. The inlet and outlet ends of the tubes are received through holes in a tubesheet disposed in the heat exchanger for supporting the tubes. The heat exchanger defines an inlet plenum chamber below the tubesheet, which inlet plenum chamber is in communication with the inlet ends of the tubes. The heat exchanger also defines an outlet plenum chamber below the tubesheet and isolated from the inlet plenum chamber, the outlet plenum chamber being in communication with the outlet ends of the tubes. During operation of the heat exchanger, a heated and radioactive primary fluid flows into the inlet plenum chamber and enters the inlet ends of the tubes to flow through the tubes. After flowing through the tubes, the primary fluid then flows through the outlet ends of the tubes and into the outlet plenum chamber. The primary fluid next flows out the outlet plenum chamber to exit the heat exchanger. A nonradioactive secondary fluid having a temperature less than the primary fluid simultaneously surrounds the exterior surfaces of the tubes above the tubesheet as the primary fluid flows through the tubes. Thus, as the heated primary fluid flows through the tubes, it gives-up its heat to the secondary fluid surrounding the exterior surfaces of the tubes to produce steam that is used to generate electricity in a manner well known in the art.

Because the primary fluid is radioactive, the heat exchanger is designed such that the radioactive primary fluid flowing through the tubes does not commingle with and radioactively contaminate the nonradioactive secondary fluid surrounding the exterior surfaces of the tubes. Therefore, the tubes are designed to be leak-tight so that the radioactive primary fluid remains separated from the nonradioactive secondary fluid to avoid commingling the primary fluid with the secondary fluid.

Occasionally, however, the heat exchanger tubes may degrade and thus may not remain leak-tight due, for example, to tube wall intergranular cracking caused by stress and corrosion occurring during operation of the heat exchanger. Therefore, the tubes are inspected to detect such stress corrosion cracking or degradation. If stress corrosion cracking is detected at a particular location in the wall of the tube, then the tube is "sleeved" at that location. When sleeving is performed, a tubular metal sleeve is inserted into the tube, so as to cover the degraded portion of the tube, and affixed thereto typically by expanding the sleeve into intimate engagement with the tube. In this manner, the sleeved tube remains in service although degraded.

However, the elastic properties of the metal sleeve may cause the sleeve to experience partial "spring back" after expansion. This phenomenon of "spring back" may in turn cause a relatively small gap to exist at the sleeve-to-tube interface. Such a gap is undesirable because the gap defines a flow path between the sleeve and the tube, which flow path may allow the radioactive primary fluid to flow through any crack in the tube and thereafter undesirably commingle with the nonradioactive secondary fluid. Therefore, it is desirable to fuse the sleeve to the tube by forming, for example, two spaced-apart weldments circumscribing the inner surface of the sleeve in order to seal the gap and the flow path defined thereby. In this regard, laser welding has been used to fuse such a sleeve to the tube.

Laser welding devices are known. A system and method for laser welding a tube is disclosed in U.S. Pat. No. 5,182,429 titled "System And Method For Laser Welding The Inner Surface Of A Tube" issued Jan. 26, 1993 in the name of William E. Pirl, et al. and assigned to the assignee of the present invention. This patent discloses a system and method for laser welding a sleeve to the inner surface of a heat exchanger tube in order to repair the tube. The Pirl, et al. system comprises an elongated tubular housing having a rotatable distal portion connected to a non-rotatable proximal portion, a fiber-optic cable for conducting remotely generated laser light into the tubular housing, a beam deflection mechanism supported within the distal portion of the housing and a reflector for radially directing and focusing laser light received from the fiber-optic cable toward the inner wall of the sleeve to weld the sleeve. In order to weld around the inner wall of the sleeve, the Pirl, et al. device provides an electric motor within the proximal portion of the tubular housing to rotate the distal portion of the housing and the reflector supported therein.

However, applicant has observed that such a prior art laser welding device and its associated motor are unsuitable for welding a sleeve having a relatively small inner diameter (e.g., an inner diameter equal to or less than approximately 0.313 inch). This is so because the size of commercially available motors is necessarily larger than the relatively small inner diameter of the sleeve. Therefore, a problem in the art is to rotate the distal portion of the tubular housing and the reflector supported therein without locating the motor within the proximal portion of the housing, so that relatively small diameter sleeves can be welded.

Therefore, what is needed are a system and method for laser welding an inner surface of a small diameter tubular member, which tubular member may be a repair sleeve disposed in a nuclear heat exchanger heat transfer tube.

SUMMARY

Disclosed herein are a system and method for laser welding an inner surface of a small diameter tubular member. The system includes a laser for generating laser light and a mirror optically coupled to the laser for reflecting the light onto the inner surface of the tubular member to laser weld the inner surface of the tubular member. A rotator assembly is connected to the mirror for rotating the mirror in order to weld around the inner surface of the tubular member. The mirror and rotator assembly are each sized to be disposed in the tubular member at a location adjacent the portion of the tubular member to be welded. The rotator assembly has a spiral groove formed in the exterior thereof for receiving a cord wrapped around the exterior of the rotator assembly. An end of the cord is connected to a motor located externally to the tubular member, so that the cord is pulled as the motor is operated. As the cord is pulled, the rotator assembly rotates for rotating the mirror. A retainer is also provided for retaining the cord in the groove as the rotator assembly rotates. Therefore, the rotator assembly and the mirror associated therewith are rotated by a motor located externally to the tubular member. Thus, the system and method of the invention are capable of welding small diameter (e.g., diameters equal to or less than approximately 0.313 inch) tubular members because the motor is located externally to the tubular member rather than being disposed in the tubular member.

In its broad form, the invention is a system for laser welding an inner surface of a small diameter tubular member, comprising laser light generating means for generating laser light; light reflecting means optically coupled to the light generating means for reflecting the light onto the inner surface to weld the inner surface; and rotating means connected to the light reflecting means for rotating the light reflecting means, the rotating means having a groove in an exterior surface thereof and a pullable cord received in the groove for rotating the rotating means as the cord is pulled, whereby a weld is formed around the inner surface as the rotating means rotates the light reflecting means.

In its broad form, the invention is also a method of laser welding an inner surface of a small diameter tubular member, comprising the steps of generating laser light by operating a laser; reflecting the light onto the inner surface to weld the inner surface by optically coupling a reflector to the laser and to the inner surface; rotating the reflector to weld around the inner surface by rotating a rotatable housing having the reflector mounted therein, the rotatable housing having a spiral groove formed in an exterior surface thereof and a pullable cord received in the groove for rotating the rotatable housing as the cord is pulled; and retaining the cord in the groove as the rotatable housing rotates by engaging a retainer with the cord.

An object of the present invention is to provide a system and method for laser welding an inner surface of a small diameter tubular member, which tubular member may be a repair sleeve disposed in a nuclear heat exchanger heat transfer tube.

A feature of the present invention is the provision of a rotatable housing sized to be disposed in the tubular member, the rotatable housing having light reflecting means mounted therein, a spiral groove formed in an exterior surface thereof and a pullable cord received in the groove for rotating the rotatable housing as the cord is pulled, so that the rotatable housing and the light reflecting means mounted therein simultaneously rotate as the rotatable housing rotates.

Another feature of the present invention is the provision of a retainer engaging the cord for retaining the cord in the groove, so that the cord is prevented from slipping-out of the groove as the cord is pulled.

Yet another feature of the present invention is the provision of a motor located remotely from the tubular member, the motor engaging an end portion of the cord for pulling the cord.

An advantage of the present invention is that tubular members having relatively small inner diameters may now be welded because the motor associated with rotating light reflecting means is remotely located with respect to the tubular member rather than being disposed inside the small diameter tubular member.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the invention, it is believed the invention will be better understood from the following description taken in conjunction with the accompanying drawings wherein:

FIG. 3 shows in vertical section a weld head belonging to the invention, the weld head disposed in the inner diameter of the sleeve to weld the inner diameter of the sleeve;

DESCRIPTION OF THE PREFERRED EMBODIMENT

Figure 1:
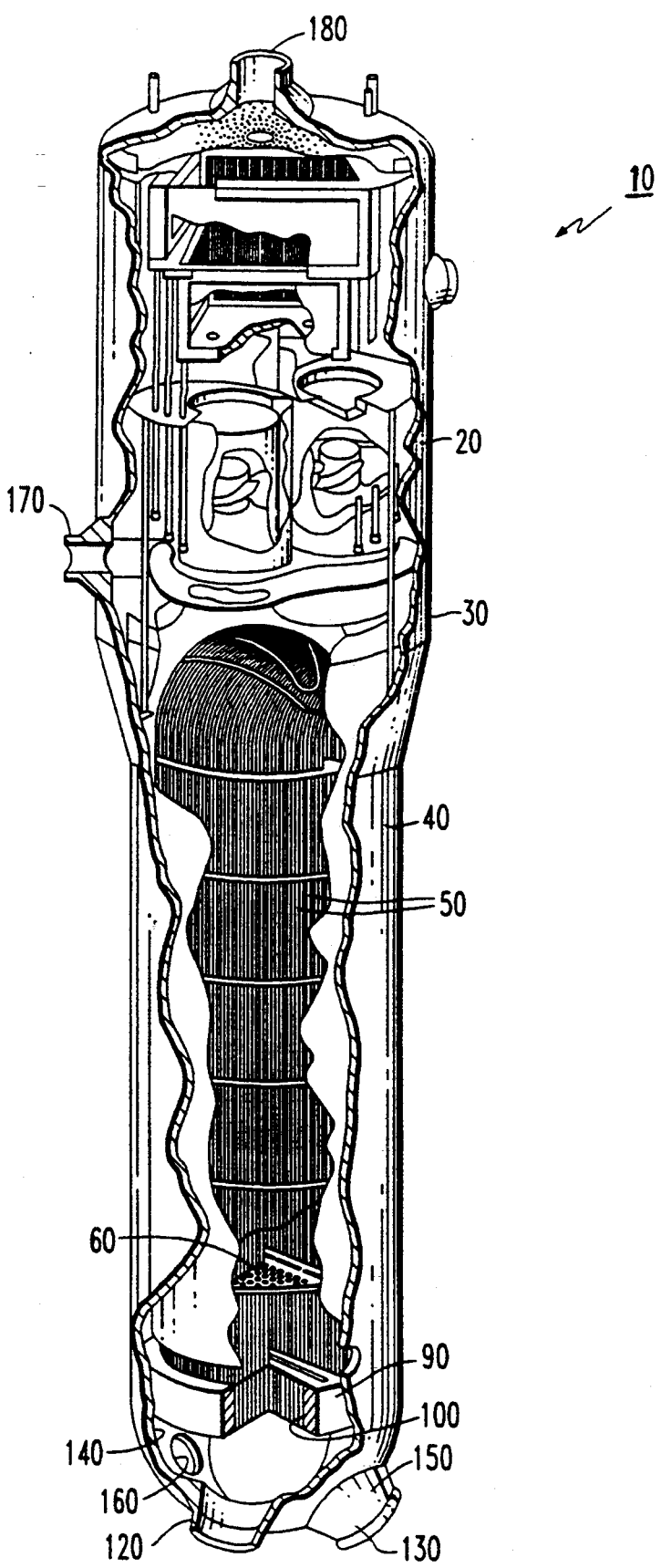
FIG. 1 is a perspective view in partial elevation showing a typical nuclear heat exchanger with parts removed for clarity, the heat exchanger having a plurality of U-shaped heat transfer tubes disposed therein.

Referring to FIG. 1, there is shown a typical nuclear heat exchanger or steam generator, generally referred to as 10, for generating steam. Heat exchanger 10 comprises a shell 20 having an upper portion 30 and a lower portion 40. Disposed in lower portion 40 are a plurality of vertically-oriented and inverted U-shaped heat transfer tubes 50 for circulating heated and radioactive primary fluid therethrough. Each tube 50 extends through its respective holes 60 formed in a plurality of spaced-apart support plates 70 for laterally supporting tubes 50. Each tube 50 may have a relatively small inside surface or inside diameter 80, which inside diameter 80 may be equal to or less than approximately 0.313 inch (see FIG. 3). As shown in FIG. 1, disposed in lower portion 40 and attached thereto is a tubesheet 90 having a plurality of apertures 100 therethrough for receiving open end portions 110 (see FIG. 3) of tubes 50. As shown in FIG. 1, disposed on shell 20 are a first inlet nozzle 120 and a first outlet nozzle 130 in fluid communication with an inlet plenum chamber 140 and an outlet plenum chamber 150, respectively. A plurality of manway openings 160 (only one of which is shown) are formed through shell 20 below tubesheet 100 for providing access to inlet plenum chamber 140 and outlet plenum chamber 150. Moreover, formed through shell 20 is a second inlet nozzle 170 for allowing entry of a nonradioactive secondary fluid into upper portion 30, which secondary fluid has a temperature less than the temperature of the heated primary fluid. A second outlet nozzle 180 is attached to the top of upper portion 30 for exit of the steam from heat exchanger 10.

During operation of heat exchanger 10, the radioactive primary fluid, heated by a nuclear heat source (not shown), flows through first inlet nozzle 120, into inlet plenum chamber 140, and through tubes 50 to outlet plenum chamber 150 where the primary fluid exits heat exchanger 10 through first outlet nozzle 130. As the primary fluid enters inlet plenum chamber 140, the secondary fluid simultaneously enters second inlet nozzle 170 and flows into upper portion 30 to eventually surround tubes 50. A portion of this secondary fluid vaporizes into steam due to conductive heat transfer from the primary fluid to the secondary fluid, the conductive heat transfer occurring through the walls of tubes 50. The steam exits heat exchanger 10 through second outlet nozzle 180 and is piped to a turbine-generator (not shown) to generate electricity in a manner well known in the art.

However, due to tube wall intergranular cracking or degradation caused by stress and corrosion, some of the small diameter tubes 50 may not remain leak-tight. If degradation is suspected, such a tube 50, although degraded, may remain in service by sleeving the degraded portion (not shown) of the tube 50. As disclosed in detail hereinbelow, the system and method of the present invention is capable of suitably sleeving such a degraded small diameter tube by means of laser welding.

Figure 2:
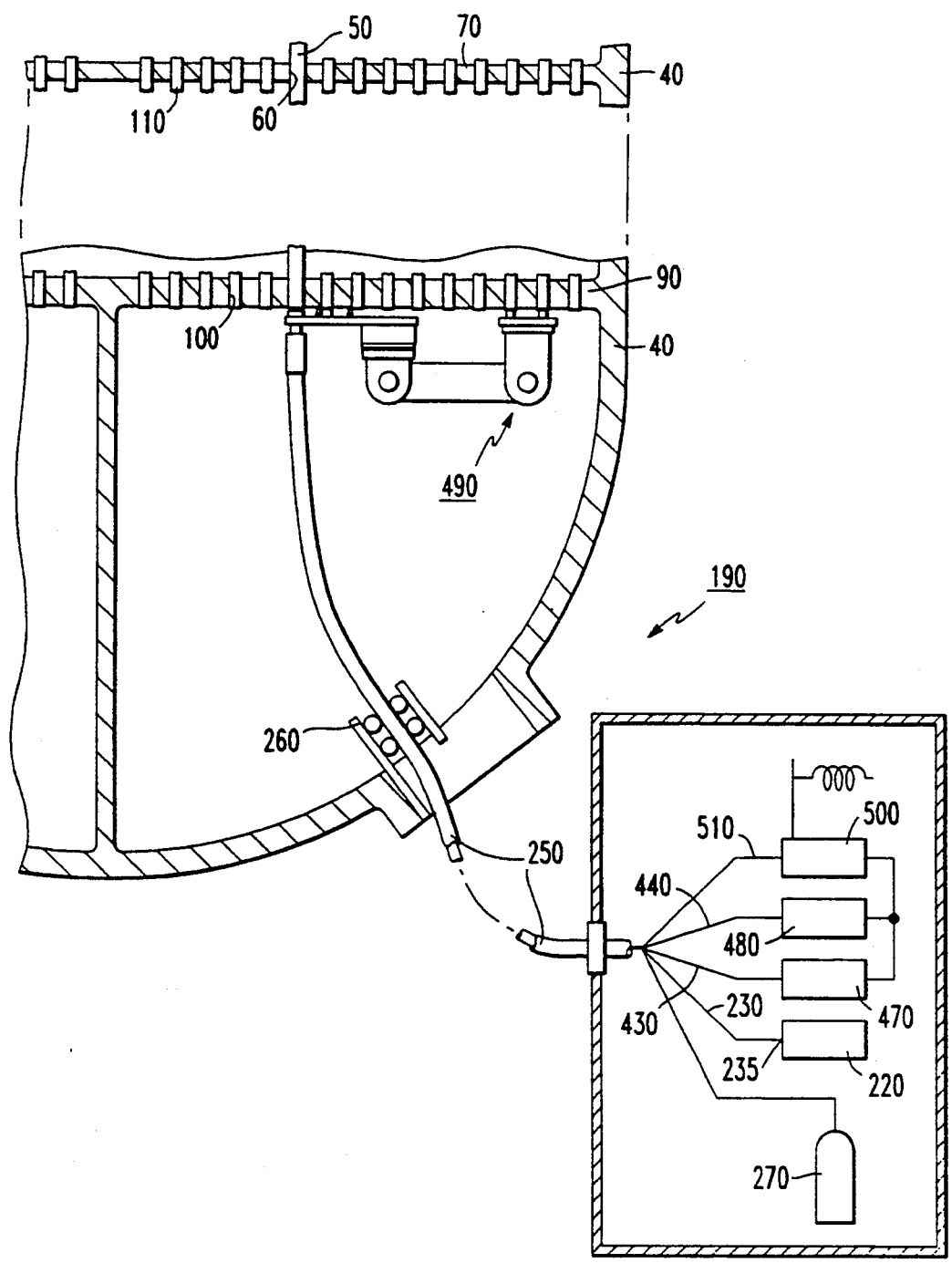
FIG. 2 illustrates the system of the invention in operative condition to weld a small diameter repair sleeve concentrically disposed in a preselected one of the tubes so that the sleeve and the tube are fused at the interface thereof.

Therefore, turning now to FIGS. 2 and 3, there is shown the subject matter of the present invention, which is a system, generally referred to as 190, for laser welding a relatively small inner diameter 200 (i.e., inner surface 200) of a first tubular member, such as a tubular sleeve 210, in order to affix or fuse sleeve 210 to the relatively small inside diameter 80 (i.e., inside surface 80) of a second tubular member, such as the tube 50. In this manner, sleeve 210 bridges, covers or sleeves the degraded portion of tube 50, so that tube 50 may remain in service although degraded.

Still referring to FIGS. 2 and 3, system 190 comprises remote laser light generating means, such as a laser 220, for generating high intensity laser light sufficient to weld the inner surface 200 of sleeve 210, such that sleeve 210 and tube 50 are sealingly joined or fused at the interface thereof. System 190 further comprises light conducting means, such as an elongate flexible fiber-optic cable 230, optically coupled to laser 220 for conducting the laser light therethrough. Fiber-optic cable 230 may be made of silica optical fiber transparent to the electromagnetic spectrum of emission of laser 220 for suitably conducting the laser light therethrough. Fiber-optic cable 230 has a first end portion 235 in optical communication with laser 230 and a second end portion 237 for reasons described presently. System 190 also comprises light reflecting means, such as a planer mirror 240, optically coupled to second end portion 237 of fiber-optic cable 230 for receiving the light emitted from the second end portion 237. Planer mirror 240 is also optically coupled to inner surface 200 of sleeve 210 for reflecting the laser light energy onto inner surface 200. In this regard, planer mirror 240 may be polished copper, molybdenum, tungsten, copper coated with silver, or the like for providing a high reflectivity surface while simultaneously resisting oxidation due to the laser light.

Referring yet again to FIGS. 2 and 3, system 190 further comprises a flexible conduit 250 extending from laser 220 and into outlet plenum chamber 150 or inlet plenum chamber 140. Conduit 250 will extend into either inlet plenum chamber 140 or outlet plenum chamber 150 depending on the portion of tube 50 to be sleeved. Extending through conduit 250 is fiber-optic cable 230. It will be appreciated from the description hereinabove that conduit 250 therefore surrounds fiber-optic cable 230 for protecting fiber-optic cable 230 from damage. Engaging conduit 250 may be a conduit driver 260 for driving conduit 250 axially along inside diameter 80 of tube 50 and into sleeve 210. Thus, conduit driver 260 is capable of advancing and withdrawing conduit 250 along the longitudinal axis of sleeve 210 and tube 50. In addition, in gas communication with inner surface 200 of sleeve 210 is a pressurized shielding gas supply 270 for supplying a shielding gas (e.g., nitrogen) to a predetermined weld zone 275 located on inner surface 200 of sleeve 210 and also to planer mirror 240, the shielding gas being supplied at a mass flow rate of approximately 10–100 liters/minute. The purpose of the shielding gas is to prevent oxidation of the weld zone, to prevent impurities from migrating into weld zone 275 and to cool planer mirror 240. Of course, it will be understood from the description hereinabove, that the inner diameter 200 of sleeve 210 is necessarily smaller than the relatively small inside diameter 80 of tube 50 because sleeve 210 is concentrically disposed within tube 50. For example, if the relatively small inside diameter 80 of tube 50 is equal to or less than approximately 0.313 inch, then the inner diameter 200 of sleeve 210 also will be relatively small (i.e., less than approximately 0.313 inch).

Figure 3A:
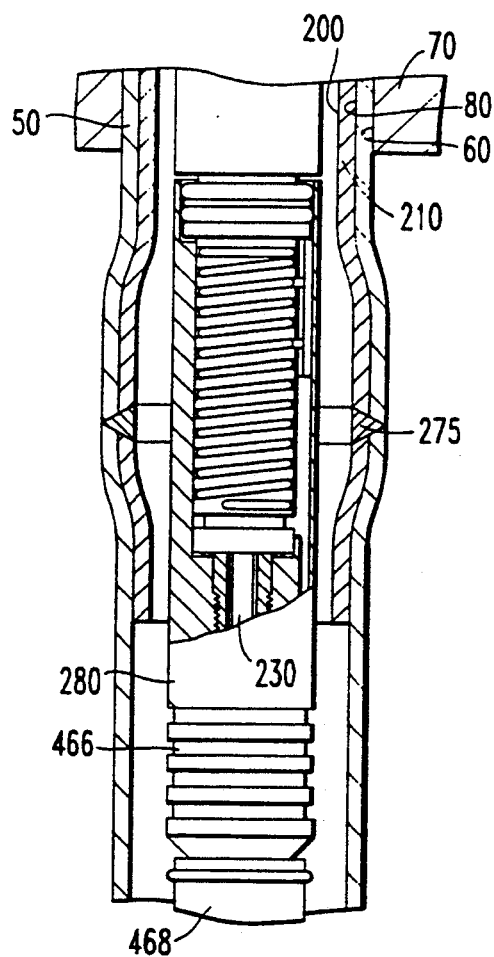
FIG. 3A is a view in elevation of a rotatable housing belonging to the weld head, the rotatable housing having a spiral groove formed in an exterior surface thereof and a pullable cord received in the groove for rotating the rotatable housing as the cord is pulled, this view also showing a retainer engaging the cord for retaining the cord in the groove.
Figure 4:
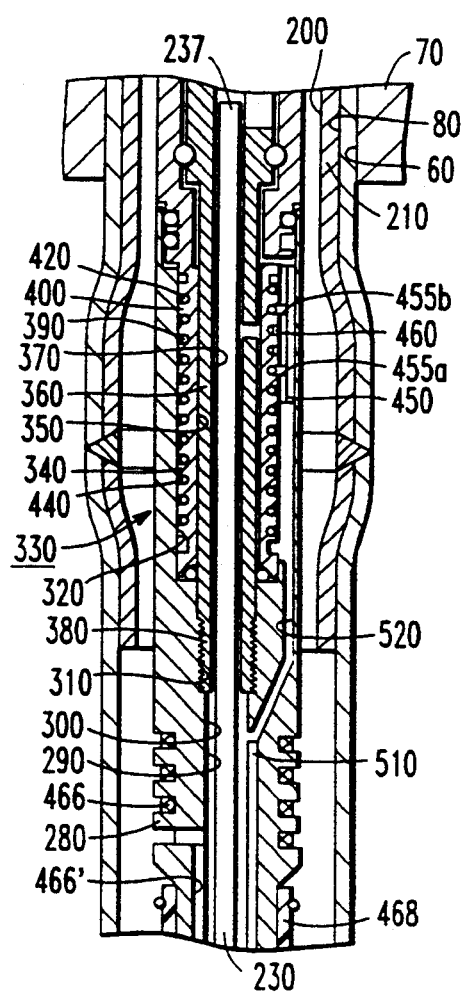
FIG. 4 is a view in vertical section of the rotatable housing.
Figure 5:
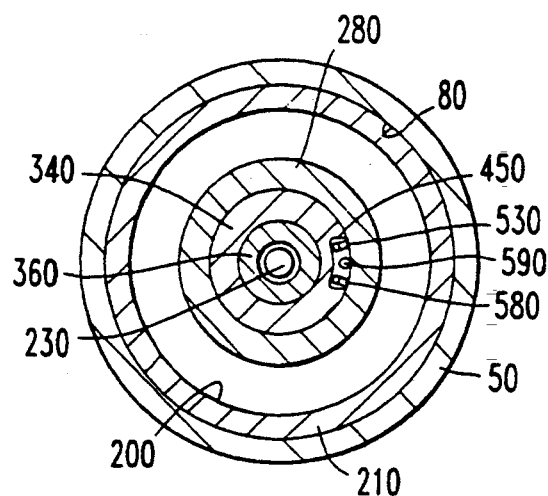
FIG. 5 is a view taken along section line 5—5 of FIG. 3.
Figure 6:
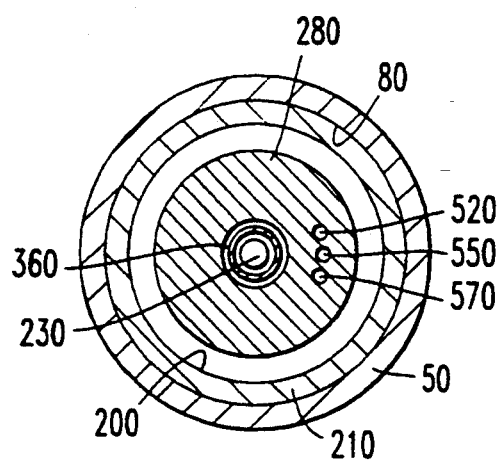
FIG. 6 is a view taken along section line 6—6 of FIG. 3.

Referring to FIGS. 3, 3A and 4, conduit 250 is connected to a generally tubular and stationary (i.e., non-rotating) housing 280 sized to be disposed in the relatively small inner diameter 200 of sleeve 210. Stationary housing 280 has a longitudinal step-bore 290 for receiving fiber-optic cable 230 in the smaller diameter 300 of step-bore 290. Step-bore 290 includes an internally threaded portion 310 for reasons disclosed hereinbelow. Step-bore 290 also has a larger diameter 320 for receiving rotating means, such as a rotator assembly, generally referred to as 330, connected to mirror 240 for rotating mirror 240, as described more fully hereinbelow. In this regard, rotator assembly 330 includes a generally cylindrical rotatable housing 340 having mirror 240 mounted therein. Rotatable housing 340 also has a centrally disposed longitudinal bore 350 surrounding a generally cylindrical cable housing 360. Cable housing 360 in turn has a longitudinal bore 370 for housing fiber-optic cable 230 and an externally threaded proximal end portion 380 threadably engaging internally threaded portion 310 of stationary housing 280 for threadably connecting cable housing 360 to stationary housing 280. It will be appreciated from the description hereinabove, that fiber-optic cable extends from laser 235 and through bores 290 and 370.

Still referring to FIGS. 3, 3A and 4, rotatable housing 340 has a helical or spiral groove 390 therearound formed in an exterior surface 400 thereof for receiving a pullable first cord 420 wrapped in a first spiral direction around rotatable housing 340. Rotatable housing 340 rotates in a clockwise first direction as first cord 420 is pulled, as described more fully hereinbelow. Groove 390 also receives a pullable second cord 440 wrapped in a second spiral direction around rotatable housing 340. The second spiral direction is oppositely-orientated with respect to the first spiral direction. Rotatable housing 340 rotates in a counter-clockwise second direction as second cord 440 is pulled, as described more fully hereinbelow. In the preferred embodiment of the invention, cords 420 and 440 are made of "KEVLAR" and may each have a diameter of approximately 0.018 inch for being matingly received in groove 390. The material "KEVLAR" is preferred because it is capable of withstanding a relatively large pulling load in tension of approximately 80 pounds force before breaking. Such a "KEVLAR" cord 420/440 comprises polyamide fibers and is available from Synthetic Thread Co. located in Bethlehem, Pa.

Figure 7:
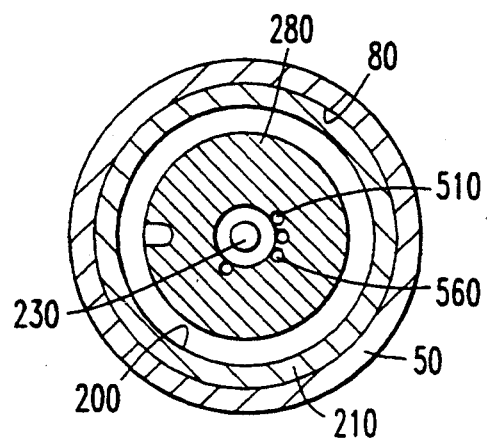
FIG. 7 is a view taken along section line 7—7 of FIG. 3.
Figure 8:
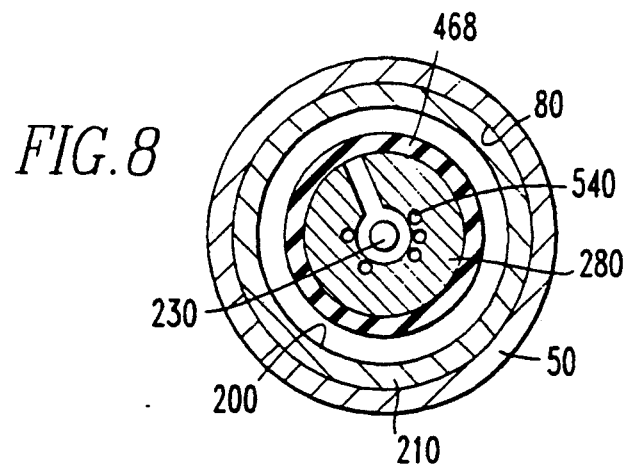
FIG. 8 is a view taken along section line 8—8 of FIG. 3.

Referring to FIGS. 3, 3A, 4 and 5, retaining means, such as a retainer 450, engages first cord 420 and second cord 440 for retaining first cord 420 and second cord 440 in groove 390. In this regard, retainer 450 is interposed between stationary housing 280 and rotatable housing 340 such that it retains first cord 420 and second cord 440 in groove 390 as first cord 430 and second cord 440 are pulled. Retainer 450 has a pair of recesses or cord ports 455a and 455b formed therein for reasons disclosed hereinbelow. Moreover, retainer 450 has a plurality of outwardly-projecting teeth 460 matingly engaging a corresponding cord-free portion of groove 390 to keep ports 455a/455b aligned with groove 390 to provide linear or axial motion to retainer 450 as described more fully hereinbelow. Also, teeth 460 engage groove 390 in such a manner as to connect string 510 (see FIG. 7) to retainer 450 and to transducer 500 (see FIG. 2) as described more fully hereinbelow.

As best seen in FIG. 3, housed in rotatable housing 340 and coaxially aligned with distal end portion 237 of fiber-optic cable 230 is a pair of colinearly aligned transparent lenses 462 for collimating and then converging onto mirror 240 the laser light emitted from distal end portion 237 of fiber-optic cable 230. In addition, mounted atop rotatable housing 340 is centering means, generally referred to as 464, for centering the weld head in tube 50 and sleeve 210. The centering means 464 contemplated herein is of the type more fully described in U.S. patent application Ser. No. 08/126212 titled "System And Method For Laser Welding An Inner Surface Of A Tubular Member" filed Sep. 13, 1993 in the name of W. E. Pirl and assigned to the assignee of the present invention, the disclosure of which is hereby incorporated by reference. In addition, an inspection probe 466, which may be an eddy current probe or an ultrasonic probe, is attached to stationary housing 280 near the proximal end thereof for locating the proximal end (i.e., bottom edge) of sleeve 210. Locating the proximal end of sleeve 210 assists in suitably positioning the weld head at a predetermined axial Location within sleeve 210. Probe 466 has an electrical lead wire (not shown) extending through a passage 466' which itself extends longitudinally through rotatable housing 340. Moreover, stationary housing 280 may have a flow channel 467 formed axially therein for conducting a fluid (e.g., the shielding gas) to a radially expandable bladder 468 surrounding the proximal end portion of stationary housing 280. Bladder 468 is capable of radially expanding into intimate engagement with inside surface 80 of tube 50 to provide a gas-tight seal between the weld head and tube 50. It is important that such a seal be provided. This is important because the seal provided by inflatable bladder 468 prevents contamination of the shield gas by the atmosphere in order to control the surface finish of the weld, the quality of the weld, and the weld penetration.

Returning to FIG. 2, system 190 further comprises a first "linear" motor 470 disposed externally to tube 50. First motor 470 engages an end portion of first cord 420 for pulling first cord 420. A second "linear" motor 480 is also disposed externally to tube 50 and engages an end portion of second cord 440 for pulling second cord 440. Rotatable housing 340 rotates about its longitudinal axis in the clockwise direction as first cord 420 is pulled by first motor 470 and rotates in the counter-clockwise direction as second cord 440 is pulled by second motor 480. First motor 470 and second motor 480 may be of the type available from MicroMo located in St. Petersburg, Fla. Moreover, system 190 may also comprise a suitable robotic mechanism, generally referred to as 490, connected to stationary housing 280 for supporting the weld head in outlet plenum 150 or alternatively in inlet plenum 140. In this regard, robotic mechanism 490 may be a ROSA (Remotely Operated Service Arm) available from the Westinghouse Electric Corporation located in Pittsburgh, Pa. In addition, system 190 may further comprise a linear displacement transducer 500 connected to an inelastic string 510 which is preferably formed of pre-expanded or pre-stretched PTFE "TEFLON". Transducer 500 is itself electrically connected to motors 470/480 in order to control the operation of motors 470/480 as described more fully hereinbelow. Transducer 500 may be of the type such as is available from Sensotec, Inc. located in Columbus, Ohio.

Referring to FIGS. 2, 3, 5, 6 and 7, first cord 420 has an end thereof connected to first motor 470. From first motor 470, first cord 420 extends through conduit 250, through a passage 510, through a cord port 520, into a bottom portion 530 of groove 390 that is formed in retainer 450, and thence into the previously mentioned cord port 455a. From cord port 455a, first cord 420 engages the proximal end portion of groove 390 and wraps around the proximal end portion of rotatable housing 340.

Referring to FIGS. 2, 3, 6 and 7, second cord 440 has an end thereof connected to second motor 480. From second motor 480, second cord 440 extends through conduit 250, through passage 560, through cord port 570, into a bottom portion 570 of groove 390 and thence into the previously mentioned cord port 455b. From cord port 455b, second cord 440 engages the distal end portion of groove 390 and wraps around the distal end portion of rotatable housing 340.

Referring to FIGS. 2, 3, 5, 6, 7 and 8, the previously mentioned inelastic string 510 has an end thereof secured to retainer 450, as at location 590, and the other end thereof connected to transducer 500 for providing input to transducer 500 such that transducer 500 is capable of monitoring the movement of retainer 450.

Figure 9:
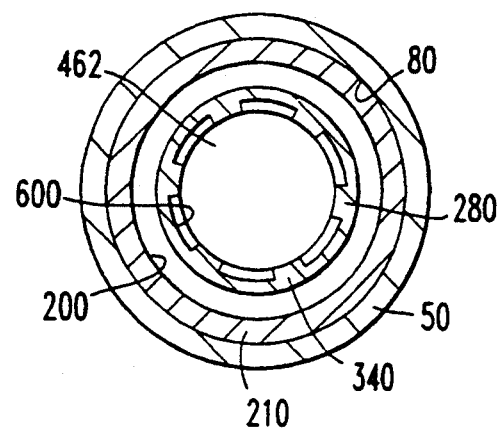
FIG. 9 is a view taken along section line 9—9 of FIG. 3.

Referring to FIG. 9, a plurality of spaced-apart and generally arcuate-shaped gas ports 600 are formed in rotatable housing 340 and surround lenses 462 for allowing gas to flow around lenses 462 in order to ameliorate oxidation of lenses 462 as lenses 462 are exposed to the laser light energy passing therethrough.

Figure 10:
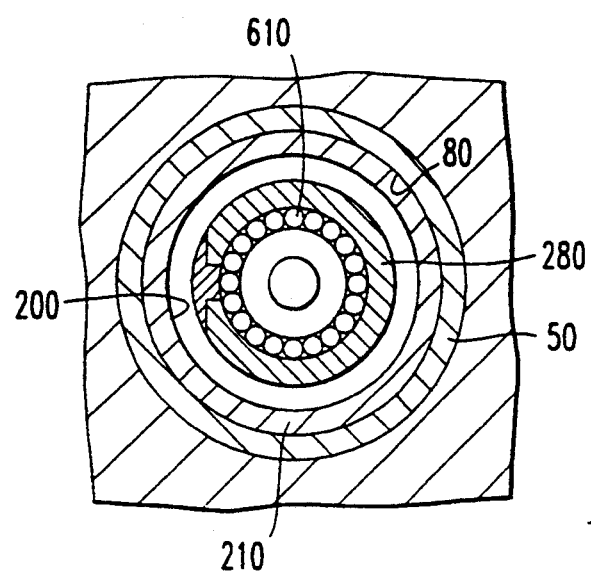
FIG. 10 is a view taken along section line 10—10 of FIG. 3.

Referring now to FIG. 10, a plurality of spherical bearings 610 are interposed between rotatable housing 340 and stationary housing 280 for allowing rotatable housing 340 to readily rotate within stationary housing 280.

OPERATION

Heat exchanger 10 is removed from service in a manner customarily used in the art and sleeve 210 is expanded into engagement with degraded tube 50 to connect sleeve 210 to tube 50 in such a manner as to cover or bridge a degraded portion (not shown) of tube 50. System 190 is then disposed sufficiently near heat exchanger 10 to perform the required laser welding.

In this regard, stationary housing 280, which belongs to the weld head, is connected to robotic mechanism 490 and then maneuvered into tube 50 by robotic mechanism 490. Conduit driver 260 is operated to drive conduit 250 and the weld head connected thereto axially along inside surface 80 of tube 50 to a position adjacent the inner surface 200 of sleeve 210 to be welded. In this regard, probe 466 is activated for precisely identifying the proximal end or bottom edge of sleeve 210 in order to axially locate the weld head adjacent the portion of sleeve 210 to be welded.

Moreover, system 190 is capable of fusing sleeve 210 to tube 50 by welding around the circumference of inner surface 200 of sleeve 210. In this regard, first motor 470 is operated to pull first cord 420. As first cord 420 is pulled, rotatable housing 340 rotates in the clockwise direction due to the engagement of first cord 420 in groove 390. Also, as rotatable housing 340 rotates, mirror 240 will rotate to a like extent because mirror 240 is fixedly mounted in rotatable housing 340. In addition, as rotatable housing 340 rotates in the clockwise direction, retainer 450 will travel axially downwardly due to the engagement of teeth 460 with the cord-free portion of groove 390. As contemplated herein, this configuration of rotatable housing 340 and its associated first cord 420 will allow rotatable housing 340 to make at least eight revolutions before retainer 450 stops its downward travel. This is important because at least five test revolutions may be required to verify the rotational speed of mirror 240 before energizing the laser to make the weld. Applicants have discovered that precisely obtaining the desired rotational speed of mirror 240 improves the quality of the weld.

After the desired rotational speed (e.g., three revolutions per minute) of mirror 240 is obtained, laser 220 is activated to emit laser light into the proximal end portion 235 of fiber-optic cable 230. As the laser light is conducted through fiber-optic cable 210, it will exit distal end portion 237 of fiber-optic cable 230 and travel through lenses 462 which collimate and then focus the light onto mirror 240 which in turn reflects the light onto inner surface 200 of sleeve 210 to weld inner surface 200. Moreover, as mirror 240 and rotatable housing 280 simultaneously rotate, the light reflected from mirror 240 will circumscribe inner surface 200 of sleeve 210 for circumferentially fusing sleeve 210 to inside surface 80 of tube 50. It will be appreciated from the description hereinabove that the invention is capable of forming multiple (e.g., two) spaced-apart circumferential weldments on inner surface 200 of sleeve 210, if desired.

As previously described, rotatable housing 340 will rotate in the clockwise direction as first cord 420 is pulled and retainer 450 will downwardly travel due to the engagement of teeth 460 with groove 390. The downward travel of retainer 450 will stop when teeth 460 reach the bottom of groove 390. At this point, it is desirable to reposition retainer 450 at the top of groove 390 to perform another circumferential weldment, if desired. In this regard, second cord 440 is pulled by second motor 480 to rotate rotatable housing 340 in the counter-clockwise direction in order to cause retainer 450 to travel to the top of groove 390. Retainer 450 will stop its upward travel when teeth 460 reach the top of groove 390. At this point, mirror 240 is in position to perform another weldment. Of course, inelastic string 510, which has one end thereof secured to rotatable housing 340 and the other end connected to transducer 500, senses the extent of movement of rotatable housing 340 and provides feedback to motors 470/480 for controllably operating motors 470/480.

After the required number of tubes 50 are sleeved in the manner described hereinabove, system 190 is removed from the vicinity of heat exchanger 10 and heat exchanger 10 is then returned to service.

It will be appreciated from the description hereinabove, that an advantage of the present invention is that it is particularly well-suited for fusing sleeve 210 to a tube 50 having a relatively small inside diameter 80 (e.g., an inside diameter less than or equal to approximately 0.313 inch). Such small diameter tubes 50 lack sufficient room therein for receiving a suitable motor to rotate mirror 240. According to the invention, rotating means is provided that is capable of rotating mirror 240 in such a manner that it is not necessary to locate a motor within such a small diameter tube 50.

Although the invention is illustrated and described herein in its preferred embodiment, it is not intended that the invention as illustrated and described be limited to the details shown, because various modifications may be obtained with respect to the invention without departing from the spirit of the invention or the scope of equivalents thereof. For example, the weld head may be axially translated in tube 50 as mirror 240 simultaneously rotates to provide a helically extending weldment on inner surface 200 of sleeve 210. A helically extending weldment provides increased assurance that sleeve 210 is sealingly fused to tube 50 because a larger surface area of the inner surface 200 of sleeve 210 will be welded.

Therefore, what is provided is a system and method for laser welding an inner surface of a small diameter tubular member, which tubular member may be a repair sleeve disposed in a nuclear heat exchanger heat transfer tube.

What is claimed is:
1. A system for laser welding an inner surface of a small diameter tubular member, comprising:
    (a) laser light generating means for generating laser light;

(b) light reflecting means optically coupled to said light generating means for reflecting the light onto the inner surface of the tubular member to weld the inner surface; and (c) rotating means connected to said light reflecting means for rotating said light reflecting means, said rotating means having a groove in an exterior surface thereof and a pullable cord received in the groove for rotating said rotating means as the cord is pulled, whereby said rotating means rotates as the cord is pulled, whereby said light reflecting means rotates as said rotating means rotates, and whereby a weld is formed around the inner surface of the tubular member as said light reflecting means rotates and reflects the light onto the inner surface of the tubular member.

2. The system of claim 1, further comprising retaining means engaging the cord for retaining the cord in the groove as said rotating means rotates.

3. The system of claim 2, further comprising pulling means engaging the cord for pulling the cord, so that said rotating means rotates as the cord is pulled.

4. A system for laser welding an inner surface of a small diameter tubular member, comprising:

(a) laser light generating means for generating laser light;

(b) light reflecting means optically coupled to said light generating means for receiving the light generated thereby and optically coupled to the inner surface of the tubular member for reflecting the light onto the inner surface to weld the inner surface; and (c) rotating means connected to said light reflecting means for rotating said light reflecting means to weld around the inner surface of the tubular member, said rotating means including:

(i) a rotatable housing having said light reflecting means mounted therein for housing said light reflecting means, said rotatable housing having a spiral groove formed in an exterior surface thereof and a pullable cord received in the groove for rotating said rotatable housing as the cord is pulled, whereby said rotatable housing rotates as the cord is pulled, whereby said light reflecting means rotates as said rotatable housing rotates, and whereby a weld is formed around the inner surface of the tubular member as said light reflecting means rotates and reflects the light onto the inner surface of the tubular member; and (ii) a retainer engaging the cord for retaining the cord in the groove as said rotatable housing rotates.

5. The system of claim 4, further comprising pulling means disposed externally to the tubular member and engaging the cord for pulling the cord, so that said rotatable housing rotates as said pulling means pulls the cord.

6. The system of claim 4, further comprising light conducting means optically coupled to said light generating means and to said light reflecting means for conducting the light from said light generating means to said light reflecting means.

7. A system for laser welding a small inner diameter of a first tubular member disposed in an inside diameter of a second tubular member so as to fuse the first tubular member to the second tubular member, comprising:

(a) a laser for generating laser light sufficient to fuse the first tubular member to the second tubular member;

(b) a reflector optically coupled to said laser for receiving the light generated thereby and optically coupled to the inner diameter of the first tubular member for reflecting the light onto the inner diameter of the first tubular member to weld the inner diameter of the first tubular member, so that the first tubular member is fused to the second tubular member as the inner diameter of the first tubular member is welded;

(c) a rotator assembly connected to said reflector for rotating said reflector to weld around the inner diameter of the first tubular member, said rotator assembly including;

(i) a rotatable housing having said reflector mounted therein for housing said reflector, said rotatable housing having a spiral groove formed in an exterior surface thereof, the groove receiving a pullable first cord extending in a first spiral direction for rotating said rotatable housing in a clockwise first direction as the first cord is pulled, the groove receiving a pullable second cord extending in a second spiral direction for rotating said rotatable housing in a counter-clockwise second direction as the second cord is pulled, whereby said rotatable housing rotates in the clockwise direction as the first cord is pulled and rotates in the counter-clockwise direction as the second cord is pulled, whereby said reflector rotates as said rotatable housing rotates, and whereby a weld is formed around the inner diameter of the first tubular member as said reflector rotates and reflects the light onto the inner diameter of the first tubular member; and (ii) a retainer engaging the first cord and the second cord for retaining the first cord and the second cord in the groove as said rotatable housing rotates.

8. The system of claim 7, further comprising:

(a) a first motor engaging the first cord for pulling the first cord; and (b) a second motor engaging the second cord for pulling the second cord.

9. The system of claim 7, further comprising a fiber-optic cable having a first end thereof optically coupled to said laser and having a second end thereof optically coupled to said reflector for conducting the light from said laser to said reflector.

10. For use in a nuclear heat exchanger having a plurality of heat transfer tubes disposed therein, at least one of the tubes having an inside diameter surrounding a tubular sleeve concentrically mounted therein, the sleeve having a small inner diameter, the inner diameter having a circumferentially extending portion thereof defining a weld zone to be welded, a system for laser welding the inner diameter at the weld zone to fuse the sleeve to the tube, the system comprising:

(a) a laser for generating laser light sufficient to fuse the sleeve to the tube;

(b) a fiber-optic cable having a first end thereof optically coupled to said laser for conducting the light therethrough, the fiber-optic cable having a second end;

(c) a mirror optically coupled to the second end of said fiber optic cable for receiving the light conducted through said fiber-optic cable and optically coupled to the inner diameter of the sleeve for reflecting the light onto the inner diameter of the sleeve to weld the inner diameter of the sleeve, so that the sleeve is fused to the tube as the inner diameter of the sleeve is welded;

(d) a rotator assembly connected to said mirror for rotating said mirror to weld around the inner diameter of the sleeve, said rotator assembly including:

(i) a tubular rotatable housing sized to be disposed in the tube and having said mirror fixedly mounted therein for housing said mirror, said rotatable housing having a spiral groove formed in a exterior surface thereof, the groove receiving a pullable first cord extending in a first spiral direction for rotating said rotatable housing in a clockwise first direction as the first cord is pulled, the groove receiving a pullable second cord extending in a second spiral direction for rotating said rotatable housing in a counter-clockwise second direction as the second cord is pulled;

(ii) a tubular stationary housing sized to be disposed in the tube, said stationary housing surrounding said rotatable housing for housing said rotatable housing;

(iii) a retainer interposed between said stationary housing and said rotatable housing, said retainer engaging the first cord and the second cord for retaining the first cord and the second cord in the groove, the groove defining a cord-free portion thereof, said retainer having a plurality of outwardly-projecting teeth engaging the cord-free portion of the groove, whereby said rotatable housing rotates in the clockwise first direction as the first cord is pulled, whereby said rotatable housing rotates in the counter-clockwise second direction as the second cord is pulled, and whereby said retainer retains the first cord and the second cord in the groove as the first cord and the second cord are pulled;

(e) a first motor disposed externally to the heat exchanger and engaging the first cord for pulling the first cord; and (f) a second motor disposed externally to the heat exchanger and engaging the second cord for pulling the second cord.

11. The system of claim 10, further comprising an inspection probe connected to said stationary housing for identifying the location of the weld zone.

12. A method of laser welding an inner surface of a small diameter tubular member, comprising the steps of:

(a) generating laser light by operating a laser;

(b) reflecting the light onto the inner surface of the tubular member to weld the inner surface by optically coupling a reflector to the laser and to the inner surface;

(c) rotating the reflector to weld around the inner surface by rotating a rotatable housing having the reflector mounted therein, the rotatable housing having a spiral groove formed in an exterior surface thereof and a pullable cord received in the groove for rotating the rotatable housing as the cord is pulled; and (d) retaining the cord in the groove as the rotatable housing rotates by engaging a retainer with the cord.

13. The method of claim 12, further comprising the step of pulling the cord to rotate the rotatable housing by operating a motor engaging the cord.

* * * * *